(12) United States Patent
Rarick et al.

(10) Patent No.: US 7,421,465 B1
(45) Date of Patent: Sep. 2, 2008

(54) ARITHMETIC EARLY BYPASS

(75) Inventors: Leonard Dennis Rarick, Los Altos, CA (US); Murali Krishna Inaganti, Santa Clara, CA (US); Shailender Chaudhry, San Francisco, CA (US); Paul Caprioli, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 797 days.

(21) Appl. No.: 10/932,522

(22) Filed: Sep. 2, 2004

Related U.S. Application Data

(60) Provisional application No. 60/584,097, filed on Jun. 30, 2004.

(51) Int. Cl.
*G06F 7/38* (2006.01)
(52) U.S. Cl. ...................................... 708/490
(58) Field of Classification Search ................... 708/490
See application file for complete search history.

(56) References Cited

U.S. PATENT DOCUMENTS 5,212,662 A * 5/1993 Cocanougher et al. ...... 708/508
5,590,365 A * 12/1996 Ide et al. ..................... 712/218

* cited by examiner

*Primary Examiner*—David H Malzahn
(74) *Attorney, Agent, or Firm*—Gunnison, McKay & Hodgson, L.L.P.; Forrest Gunnison

(57) ABSTRACT

A value that bypasses some of the computations for an arithmetic operation can be supplied for performance of a dependent arithmetic operation without waiting for completion of the computations of the arithmetic operation. During performance of a first arithmetic operation, a value is generated. The value is viable for use in performing a second arithmetic operation that is dependent upon the first arithmetic operation. The value is utilized to continue performance of the first arithmetic operation and commence performance of the second arithmetic operation. As part of the continued performance of the first arithmetic operation, determining whether the value is to be modified for the first arithmetic operation. Compensating for modifications to the value for performance of the second arithmetic operation.

50 Claims, 10 Drawing Sheets

ARITHMETIC EARLY BYPASS

RELATED APPLICATION

This application claims the benefit of U.S. Provisional Application No. 60/584,097 filed Jun. 31, 2004 entitled "Arithmetic Early Bypass" and naming Leondard Dennis Rarick, Murali Krishna Inaganti, Shailender Chaudhry and Paul Caprioli as inventors.

BACKGROUND

1. Field of the Invention

The present invention relates to the field of computers. More specifically, the present invention relates to computer architecture.

2. Description of the Related Art

In general, a floating point arithmetic path includes structures that perform arithmetic computations, normalizing computations, rounding computations, and formatting computations. Exemplary arithmetic computations include Booth encoding for multiplication, and aligning and adding for addition. Numerous structures implement these computations, such as Booth multiplexers, shifters, multiplexers, and Wallace trees. After the arithmetic computations, normalizing computations make adjustments to the mantissa of the generated value until the most significant bit is a non-zero value, and then make corresponding adjustments to the coefficient. Since a characteristic of arithmetic computations with floating-point representations is rounding error, normalization of the computed value is generally followed by rounding computations. The rounding computations determine whether the normalized floating-point value requires rounding, and, if so, rounds the value (i.e., increments the value).

In some sequences of operations, a value generated by a first arithmetic operation will be utilized as an operand in a second arithmetic operation (i.e., the second arithmetic operation is dependent on the first arithmetic operation). For example, assume the following two arithmetic operations:

$$A*B=C \qquad 1)$$

$$D*C=F \qquad 2)$$

The first arithmetic operation generates a value C, which is the multiplicand in the second arithmetic operation. The second arithmetic operation is dependent upon the result of the first arithmetic operation. Assume the first arithmetic operation involves performing arithmetic computations, normalizing computations, and rounding computations. All of these computations are performed for the first arithmetic operation to generate C, which is then supplied for execution of the second arithmetic operation. Hence, execution of the second arithmetic operation is delayed until the first operation generates the value C, and supplies the result for the second arithmetic operation. Accordingly, a technique is desired that reduces the stall of an arithmetic operation dependent on a value generated from another arithmetic operation.

SUMMARY

It has been discovered that a value generated during execution of a first arithmetic operation, but prior to completion of the first arithmetic operation, can be supplied for execution of a dependent arithmetic operation. The value is made available to the dependent arithmetic operation, and execution of the dependent arithmetic operation can begin prior to completion of the first arithmetic operation. The arithmetic computations of the dependent arithmetic operation compensate for the computations of the first arithmetic operation bypassed by the supplied value. For example, if a value supplied to a dependent arithmetic operation bypasses rounding computations of the first arithmetic operation, then the dependent arithmetic operation accounts for the bypassed rounding in its arithmetic computations.

These and other aspects of the described invention will be better described with reference to the Description of the Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

FIG. 1A depicts an exemplary arithmetic path that implements early bypass. FIG. 1B depicts an exemplary multiplication path that implements early bypass and processing of a source multiplication operation. FIG. 1C depicts the exemplary multiplication path that implements early bypass and supplying of the early bypass value for execution of a dependent multiplication operation.

FIG. 3A depicts an exemplary early bypass logic that completes normalization of an early bypass value prior to routing the early bypass value. FIG. 3B depicts exemplary early bypass routing logic with partial normalization of a signed early bypass value.

The use of the same reference symbols in different drawings indicates similar or identical items.

DESCRIPTION OF THE EMBODIMENT(S)

Figure 1A:
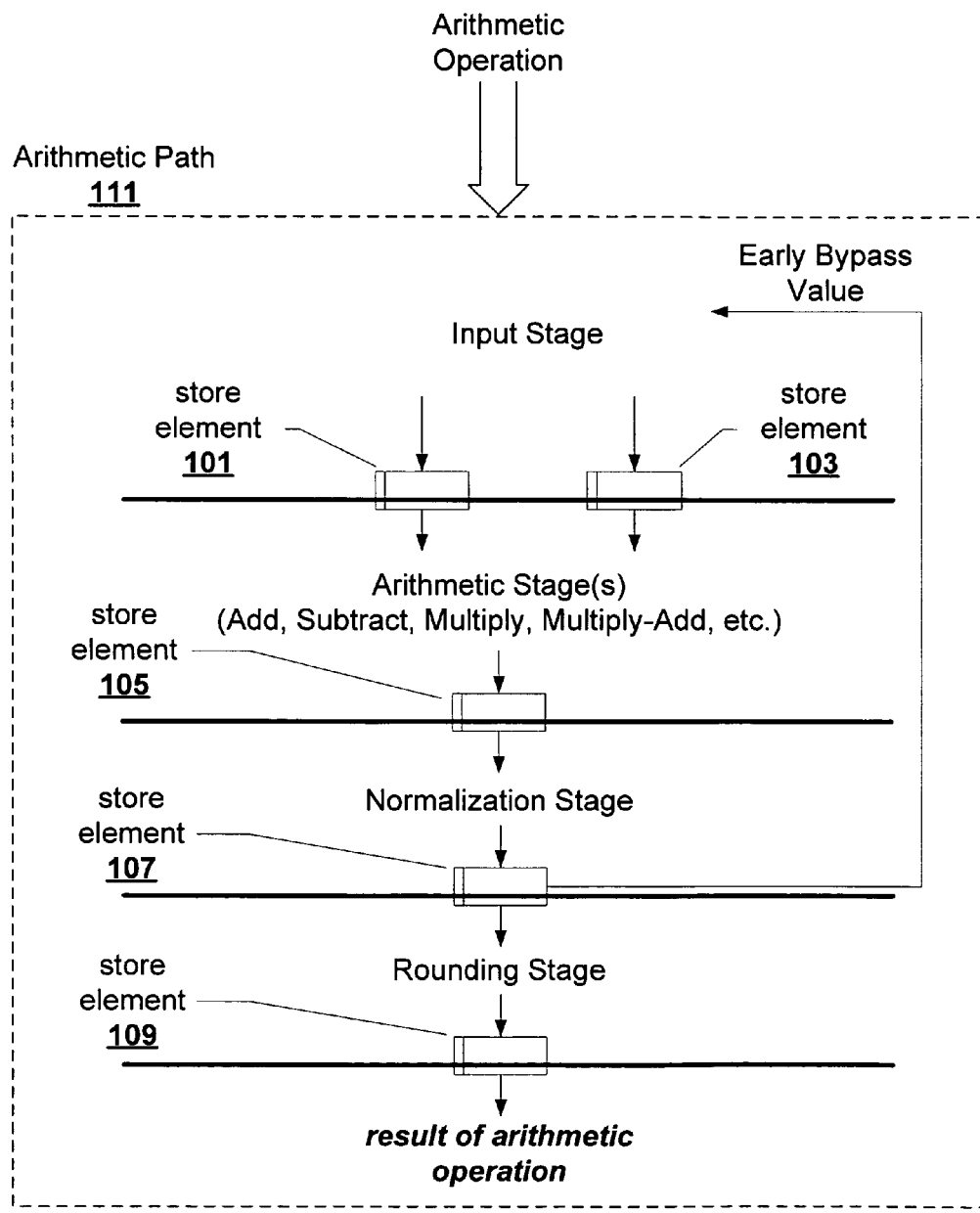
FIGS. 1A-1C depict exemplary arithmetic paths that implement early bypass.

The description that follows includes exemplary systems, methods, techniques, instruction sequences and computer program products that embody techniques of the present invention. However, it is understood that the described invention may be practiced without these specific details. For instance, although the following description refers to multiply, add, and multiply-add operations, the early bypass of an unrounded result can be applied to a variety of arithmetic operations, such as subtraction, etc. Multiply, Addition and Multiply-Add are described in detail in order to aid in understanding the invention. In other instances, well-known protocols, structures and techniques have not been shown in detail in order not to obscure the invention.

Assuming a second operation ("the dependent operation") is dependent upon a value generated by a first operation ("the source operation"), expeditiously supplying the value to the second operation reduces delay of initiation of the dependent operation. Assume the following two operations with the dependent operation being dependent on the first:

$$A*B=C \quad\quad\quad 1)$$

$$D*C=F \quad\quad\quad 2)$$

The value C is illustrated as the multiplier, but may be the multiplicand or both the multiplier and the multiplicand in the dependent arithmetic operation. A value generated during execution of the source operation can be supplied to the dependent operation prior to all of the computations or stages of the first operation being performed. At one or more points in the arithmetic path that implements the source operation a value is generated that is viable for use in the dependent operation. Although the value is viable for the dependent operation, the value will most likely not be the same as the value generated after the remaining computations of the source operation are performed. For example, a value S is generated after the arithmetic computations of the source operation are performed. However, the value C is not generated until the value S has been normalized, rounded, and formatted. Hence, the value S and the value, C, most likely are not the same. However, compensating for the discrepancy between the value S and the value C within the arithmetic computations of the dependent operation insures that the dependent operation does not generate a defective result because the value S was utilized in its computations. Bypassing some of the computations of a source arithmetic operation prior to completion of the source arithmetic operation is hereinafter referred to as early bypass. Consequently, the value supplied to a dependent arithmetic operation, which bypasses at least some of the computation of the source arithmetic operation, is referred to hereinafter as the early bypass value.

Realizations of arithmetic early bypass involve 1) supplying the early bypass value on short channels (e.g., line, wire, bus, etc.) to the beginning of an arithmetic path implementing the dependent arithmetic operation, 2) determining if bypassed computations introduce differences between the early bypass value and the result value, and 3) compensating for the affects, if any, on the early bypass value during performance of the dependent arithmetic operation (i.e., addressing defects in the early bypass value in computations of the dependent arithmetic operation). Various realizations (e.g., across different types of arithmetic operations) may also involve routing the early bypass value, input selection among operand input lines and early bypass lines, etc.

Figure 1B:
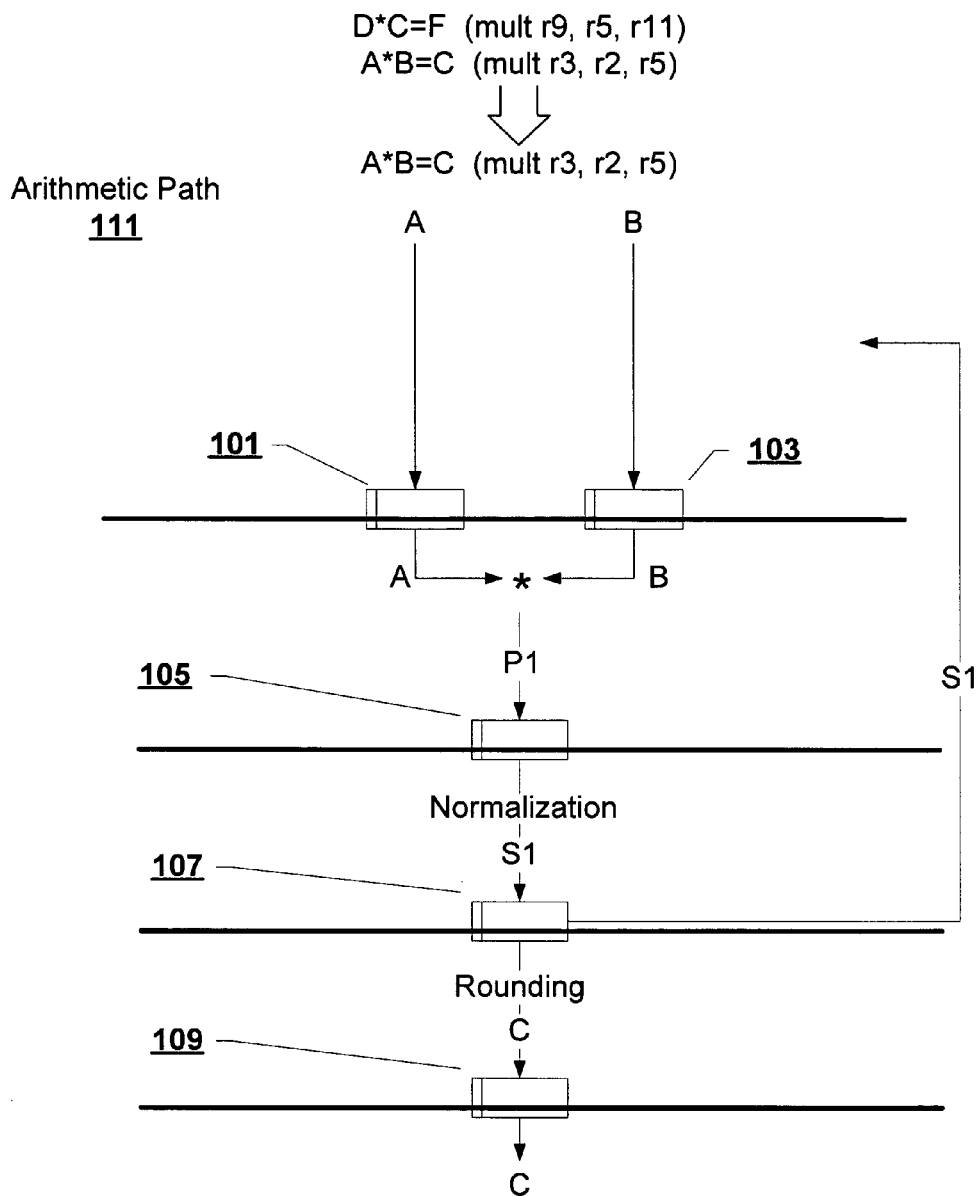
Figure 1C:
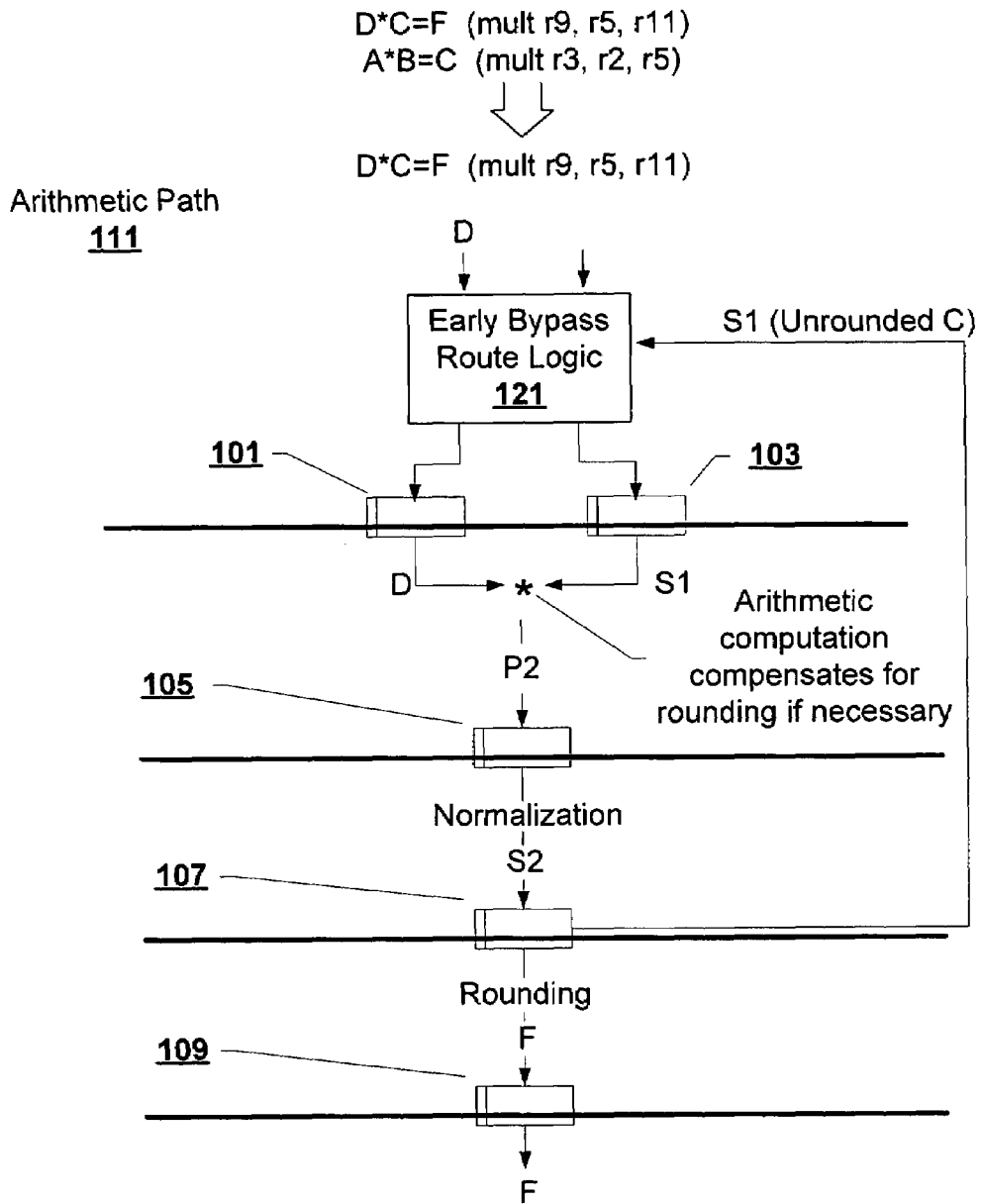

FIGS. 1A-1C depict exemplary arithmetic paths that implement early bypass. FIG. 1A depicts an exemplary arithmetic path that implements early bypass. An arithmetic path 111 includes the following stages: an input stage, an arithmetic stage(s), a normalize stage, and a rounding stage. The arithmetic path 111 receives an arithmetic operation, and the operands of the received arithmetic operation flow into store elements 101 and 103. The values in the store elements 101 and 103 flow into the arithmetic stage (e.g., add, subtract, multiply, multiply-add, etc.). The value generated from the arithmetic stage flows into a store element 105, and then into the normalization stage. The value generated from the normalization stage flows into a store element 107. The store element 107 supplies its hosted value both to the input stage and the rounding stage. Hence, the value supplied to the input stage for a dependent arithmetic operation bypassed rounding. The value generated from the rounding stage flows into a store element 109.

The arithmetic path 111 may execute an arithmetic operation comprised of three or more operands, store multiple operands within a single store element, etc. Numerous incarnations of an arithmetic path can be realized with additional stages, fewer stages, etc. The number of clock cycles to perform computations of the various stages varies across architectures and designs. In addition, the length of a channel to carry a value varies across different designs and architectures. The illustration of the arithmetic path 111 is provided to aid in understanding the described invention and avoid obfuscating the described invention with a myriad of various realizations.

The following exemplary illustrations depict routing an early bypass value as one or more operands of a dependent arithmetic operation, and compensating for the computations bypassed in the early bypass value in the arithmetic computations of the dependent arithmetic computations. Routing of the early bypass value varies in the following illustrations depending on which operand corresponds to the early bypass value. The technique for compensating for bypassed computations varies in relation to the type of arithmetic operation being performed.

FIG. 1B depicts an exemplary multiplication path that implements early bypass and processing of a source multiplication operation. A source multiplication operation (A*B=C) and a dependent multiplication operation (D*C=F) flow into the arithmetic path 111. Exemplary instructions that implement the source multiplication operation and the dependent multiplication operation respectively include mult r3, r2, r5 and mult r9, r5, r11 (in these exemplary instructions, the source locations precede destination locations). The source multiplication operation flows into the arithmetic path 111. Its operands, A and B, are respectively stored in the store elements 101 and 103. In the arithmetic stage, the operands are multiplied to generate a product P1. The product P1 is stored in the store element 105. The value P1 is normalized to generate a value S1, which is stored in the store element 107. The normalized value S is supplied to both the rounding stage and the input stage. The value S1 flows into the rounding stage, which generates the value C.

FIG. 1C depicts the exemplary multiplication path that implements early bypass and supplying of the early bypass value for execution of a dependent multiplication operation. The arithmetic path 111 receives the dependent multiplication operation D*C=F. The operand D flows into an early bypass route logic 121. Exemplary illustrations of early bypass logic are provided later herein. The early bypass value, S1 (the unrounded C), also flows into the early bypass route logic 121. From the early bypass route logic 121, the operand D flows into the store element 101 and the early bypass value S1 flows into the store element 103. The operand D and the early bypass value S1 flow into the arithmetic stage to be multiplied. The multiplication computations for the dependent multiplication operation compensate for rounding if necessary, which will be described in more detail below. If the rounding stage for the source multiplication operation determines that the value S1 should be rounded, then the multiplication computations for the dependent multiplication operation will account for the rounding in performing the multiplication computations. The arithmetic stage for the dependent multiplication operation generates a value P2, which flows into the store element 105. The value P2 is normalized, if necessary, and S2 is generated, which flows into the store element 107. Finally, the normalized value S2 flows into the rounding stage and is rounded, if necessary, to generate the value F for the dependent arithmetic operation, and stored in the store element 109.

Routing/Input Selection

Routing/input selection utilized discovered dependency information (e.g., which operand is dependent). To discover dependency information, one or more current operations are examined against other operations. The examination may be between an incoming operation and an executing operation, an executed operation and a pending operation, parallel operations, etc. Another variable to consider for examination may include distance between operations.

Figure 2:
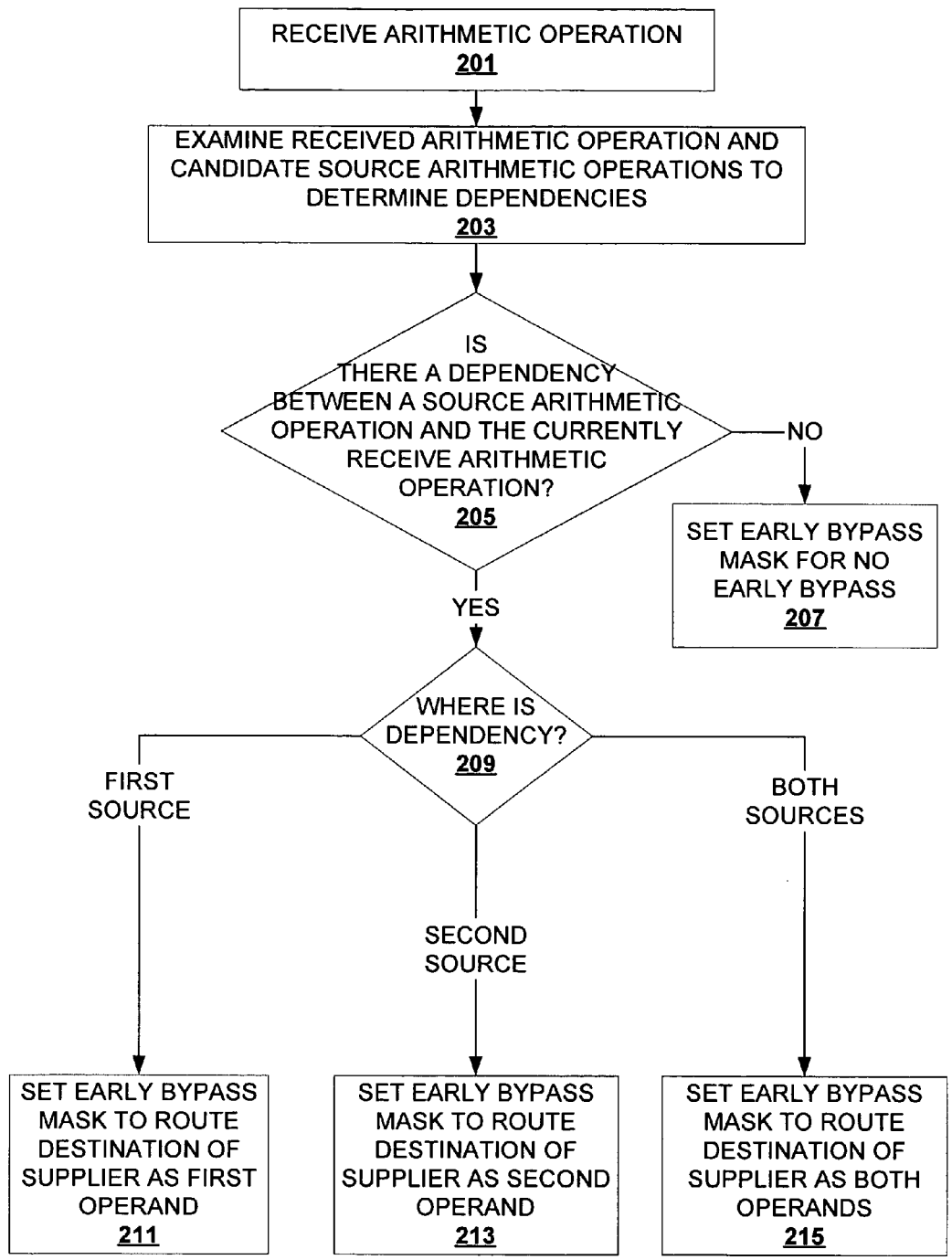
FIG. 2 depicts an exemplary flowchart for examining arithmetic operations for dependency.

FIG. 2 depicts an exemplary flowchart for examining arithmetic operations for dependency. At block 201, an arithmetic operation is received. At block 203, the received arithmetic operation and a source arithmetic operation are examined. Various realizations of the described invention may maintain information about multiple candidate source arithmetic operations and examine a current arithmetic operation against the multiple candidate source arithmetic operations. The candidate source arithmetic operation may be previously received, previously executed, previously observed, received in parallel, etc. At block 205, it is determined if there is a dependency between the previous arithmetic operation and the current arithmetic operation (i.e., whether the destination of the candidate source arithmetic operation is a source for the current arithmetic operation). If a dependency exists between a source arithmetic operations and the current arithmetic operation, then control flows to block 209. If a dependency does not exist between the arithmetic operations, then control flows to block 207.

At block 207, an early bypass mask is set to indicate no early bypass.

At block 209, the dependency is determined (i.e., it is determined whether the dependency is between the destination and a first source operand, a second source operand, or both source operands). If the dependency is with the first source operand, then control flows to block 211. If the dependency is with the second source operand, then control flows to block 213. If the dependency is with both source operands, then control flows to block 215.

Assuming the second operand of a dependent operation flows though structures that compensate for bypassed computations, then, at block 211, the early bypass mask is set to route the destination of the source arithmetic operation as the second source operand of the current arithmetic operation.

At block 213, the early bypass mask is set to route the destination of the source arithmetic operation as the second source operand of the current arithmetic operation.

At block 215, the early bypass mask is set to route the destination of the source arithmetic operation as both source operands of the current arithmetic operation.

While the flow diagram shows a particular order of operations performed by certain realizations of the invention, it should be understood that such order is exemplary (e.g., alternative realizations may perform the operations in a different order, combine certain operations, overlap certain operations, perform certain operations in parallel, etc.). For example, it may be determined sequentially whether the dependency exists with the first operand, the second operand, both the first and second operands, or no dependency exists.

As described in the description of FIG. 2, the early bypass value is routed to flow through the structures of the arithmetic path that will compensate for the bypassed computations. For purposes of this illustration, assume the arithmetic structures implement multiplication and that the bypassed computations are rounding computations. Assume the following arithmetic operations are to be performed by the exemplary arithmetic path.

$A*B=C$ $D*C=F$

Given an arithmetic path where the first source operand is processed as the multiplicand and the second source operand is processed as the multiplier and that the arithmetic path utilizes the multiplier in compensating for bypassed computations, then the early bypass value is routed as the multiplier, regardless of how it appears in the arithmetic operation. With reference to the above exemplary operation, D is illustrated as the multiplicand, so the early bypass value will be routed as the multiplier and the multiplicand D will flow without being affected by routing. If D were the multiplier (i.e., $C*D=F$), then D would still be routed as the multiplicand and the early bypass value will be routed as the multiplier. If the dependent arithmetic operation was $C*C$, then the early bypass value would be routed to both the multiplicand and the multiplier. It should be understood that routing of the early bypass value depends on implementation of the arithmetic path and technique for compensating for bypassed computations, the arithmetic computations, the arithmetic structures, etc.

Figure 3A:
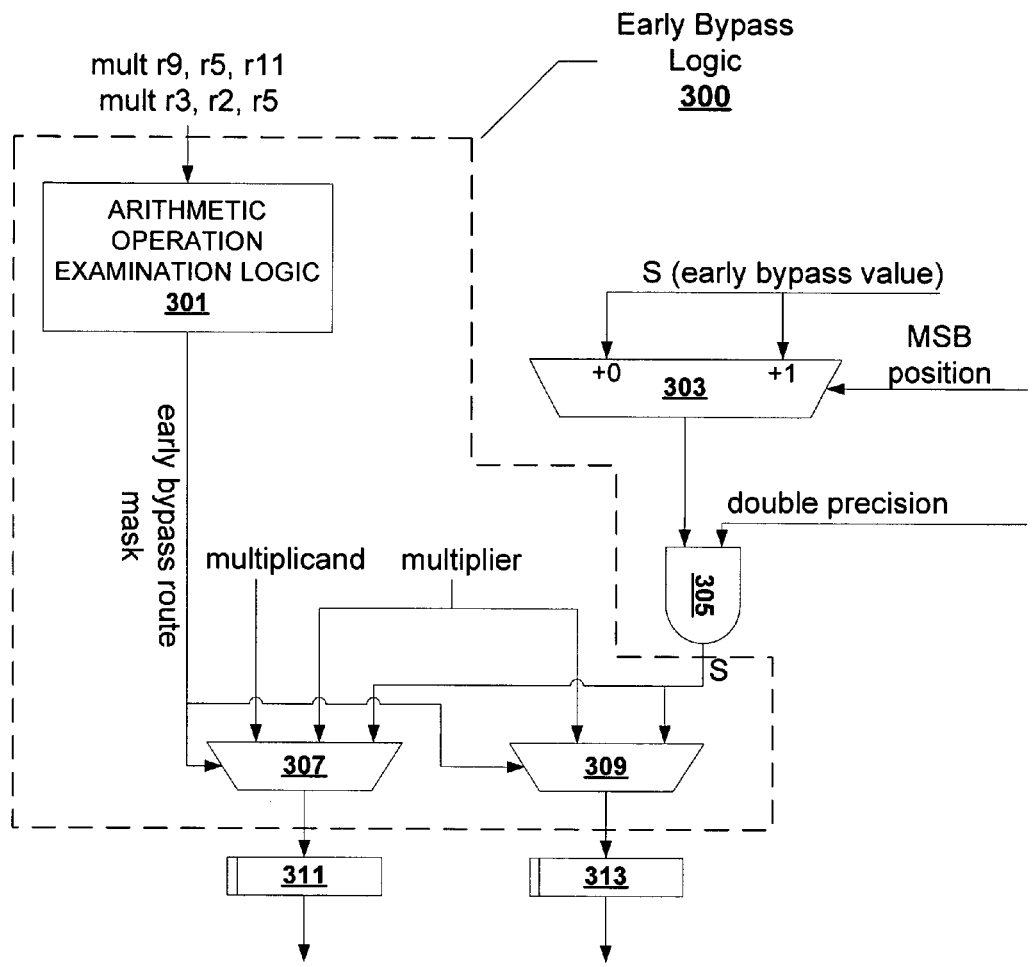
FIGS. 3A-3B depict exemplary early bypass route logic.
Figure 3B:
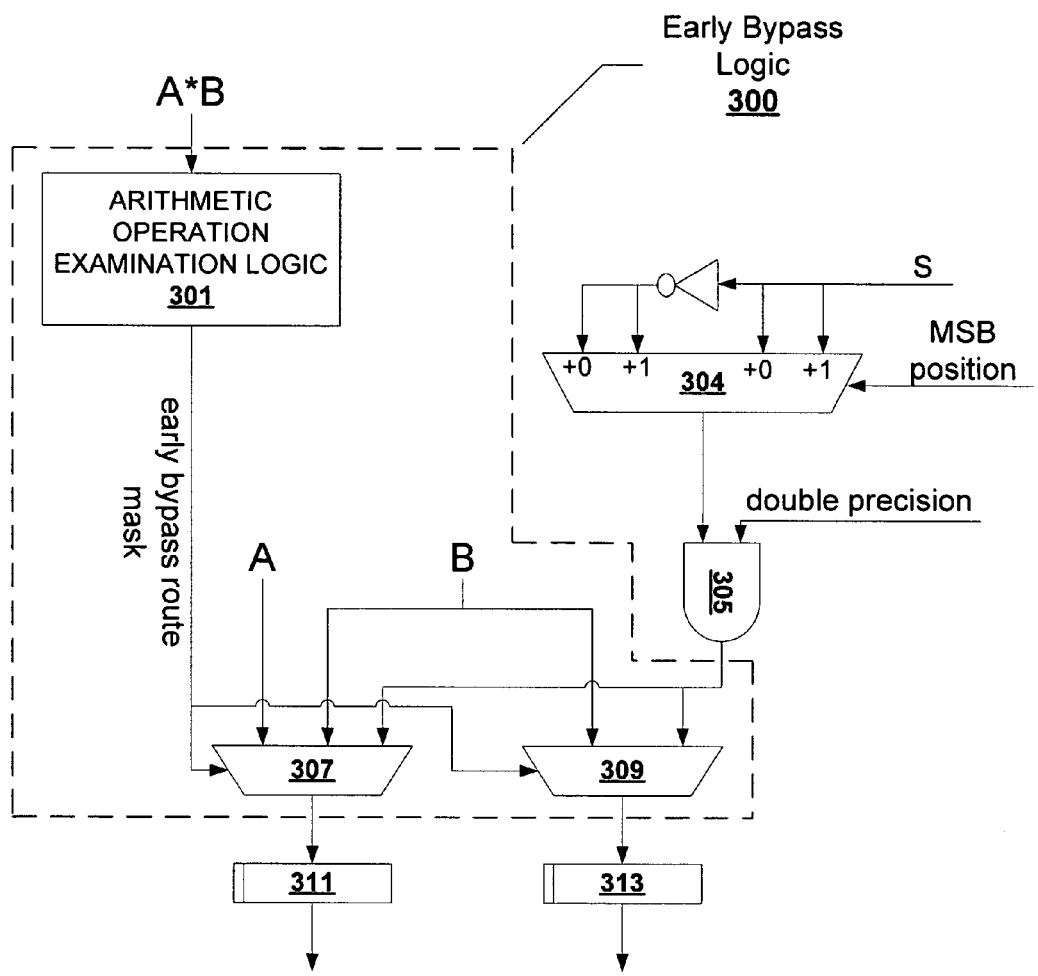

FIGS. 3A-3B depict exemplary early bypass route logic. FIG. 3A depicts an exemplary early bypass logic that completes normalization of an early bypass value prior to routing the early bypass value. In the exemplary illustration of FIG. 3A, an early bypass route logic 300 includes an arithmetic operation examination logic 301, multiplexers 307 and 309, and an AND gate 305. A multiplexer 303 is coupled with an AND gate 305. The AND gate is coupled with multiplexers 307 and 309. An arithmetic operation examination logic 301 is coupled with the multiplexers 307 and 309. The multiplexer 307 is coupled with an input line that supplies a multiplicand input. The multiplexer 309 is coupled with an input line that supplies a multiplier input. The multiplexers 307 and 309 are respectively coupled with store elements 311 and 313 (e.g. flip-flops).

An early bypass value, S, is received as input into the multiplexer 303. A signal that indicates the position of the most significant bit of S is the control signal for the multiplexer 303. If the MSB position is in the leftmost position (assuming Big-Endian bit ordering), then there is no shift of the early bypass value. If the MSB is not in the leftmost position, then the early bypass value is shifted by one position in order to complete the normalization. In this particular example, it is assumed that a portion of normalization was postponed until after rounding. Hence, the postponed portion of normalization is completed prior to routing of the use of the early bypass value in the dependent arithmetic operation. A portion of the output of the multiplexer is input for an AND gate 305, which also receives a double precision signal as input. Although FIGS. 3A and 3B illustrate exemplary logic that handles single precision and double precision values, the described invention may be implemented in systems that internally represent values for computations with a single format and convert after computations are performed, that represent values in a single format without conversion, etc. For example, a system may perform all computations with double precision values.

Normalization may have already been completed prior to S arriving at the input stage. If so, then normalization computations would not be performed in the input stage (i.e., early bypass value would not flow into the multiplexer 303. The output of the AND gate 305 (i.e., the normalized early bypass value), flows as input into multiplexers 307 and 309. The multiplexers 307 and 309 route S appropriately in accordance with a control signal received from the arithmetic operation examination logic 301. The multiplexers 307 and 309 receive a control signal from the arithmetic operation examination logic 301. The arithmetic operation examination logic 301 examines each of the arithmetic operations executed by the arithmetic path against previously executed or currently executing arithmetic operations (e.g., performing operations such as those illustrated in FIG. 2). The arithmetic operation examination logic 301 examines the operands of arithmetic operations to determine dependencies. For example, the arithmetic operation examination logic 301 compares the destination (e.g., registers, memory addresses, etc.) of a previous arithmetic operation and the source operands of the current arithmetic operation. Assume the following two arithmetic operations:

mult r3, r2, r5 //previous arithmetic operation mult r9, r5, r11 //current arithmetic operation The arithmetic operation examination logic 301 will examine the two arithmetic operations and determine that there is a dependency between the destination of the previous arithmetic operation and the second source operand of the current arithmetic operation. The mask generated by the arithmetic operation examination logic 301 controls routing of values by multiplexers 307 and 309.

For purposes of illustrating FIG. 3A, there are 4 possible states that represent dependencies between two arithmetic operations to be reflected by the early bypass route mask generated by the arithmetic operation examination logic 301: no dependency, dependency with the operand that is the multiplicand, dependency with the operand that is the multiplier, and dependency with both the multiplicand and the multiplier. For this illustration, the value from the multiplexer 309 flows into the arithmetic structures that compensate for bypassed computations as realized in the early bypass value. Hence, the multiplexer 309 controls which value will flow into the compensating arithmetic structures. The following table provides a tabular representation of exemplary relationships between states and input selection.

TABLE 1

Input Selection and Dependency States

| States | Non-compensating Path Input Selection | Compensating Path Input Selection |
|---|---|---|
| No dependency | Select multiplicand input | Select multiplier input |
| Dependency with multiplicand | Select multiplier input | Select early bypass input |
| Dependency with multiplier | Select multiplicand input | Select early bypass input |
| Dependency with both multiplicand and multiplier | Select early bypass input | Select early bypass input |

If there are no dependencies, then early bypass value input is not selected and the operands of the current arithmetic operation will flow with routing as if early bypass routing were not implemented. If the dependency exists with the multiplier of the current arithmetic operation, then the multiplexer 307 selects the multiplicand of the current arithmetic operation and the multiplexer 309 selects the early bypass input. If the dependency exists with the multiplicand, then the multiplexer 307 selects the multiplicand input, and the multiplexer 309 selects the early bypass input. If the dependency exists with the multiplicand and the multiplier, then both multiplexers 307 and 309 select the early bypass input.

FIG. 3B depicts exemplary early bypass routing logic with partial normalization of a signed early bypass value. The early bypass logic 300 of FIG. 3B is coupled with a multiplexer 304 instead of the multiplexer 303 as depicted in FIG. 3A. Similar to FIG. 3A, the multiplexer 304 of FIG. 3B receives a control signal that corresponds to the bit position of the MSB of the early bypass value. However, the multiplexer 304 has four selections instead of two. The first two selections are either the early bypass value or the early bypass value shifted by one. The second two selections are the inverse of the early bypass value or the inverse of the early bypass value incremented by one.

Multiplication

Figure 4:
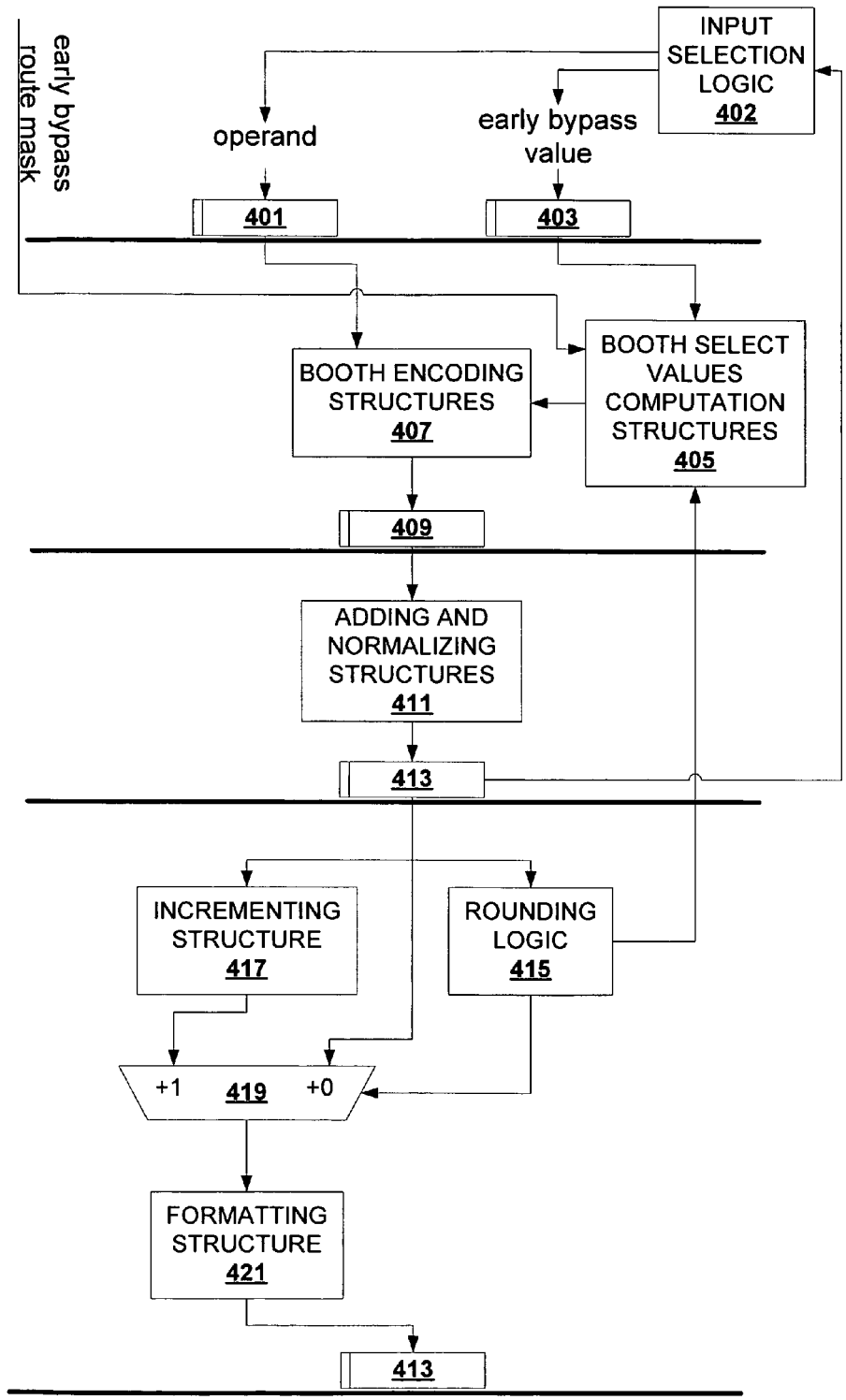
FIG. 4 depicts part of an arithmetic (multiplication) path and the structures of the arithmetic path.

As previously stated, routing of operands and the early bypass value relates to the technique utilized to compensate for the bypassed computations, and the technique for compensating relates to the arithmetic operation being performed. FIG. 4 depicts exemplary arithmetic structures that compensate for bypassed rounding in performing Booth encoding for multiplication computations. FIG. 4 depicts part of an arithmetic (multiplication) path and the structures of the arithmetic path. As previously stated, the stages and number of cycles to perform an arithmetic operation will vary, so the stages illustrated in FIG. 4 are exemplary and provided to aid in understanding the described invention and not meant to be limiting upon the described invention. In FIG. 4, the structures are organized into 4 stages. A first stage includes store elements 401 and 403, and an input selection logic. A second stage includes Booth encoding structures 407, Booth selection values computation structures 405, and a store element 409. A third stage includes adding and normalizing structures 411 (e.g., carry save adder(s) and or carry look-ahead adder(s) and a store element 413. A fourth stage includes an incrementing structure 417, a rounding logic 415, a multiplexer 419, a formatting structure 421, and a store element 423.

The store elements 401 and 403 are coupled with input selection logic 402. The store element 403 is coupled to output to Booth selection values computation structures 405. The Booth selection values computation structures is also coupled to receive input from the rounding logic 415. The store element 401 is coupled to output a value to a Booth encoding structures 407. The Booth encoding structures 407 are coupled to output to a store element 409. The Booth selection values computation structures 405 are coupled to output to the Booth encoding structures 407. The store element 409 is coupled to output to adding and normalizing structures 411. The adding and normalizing structures 411 are coupled to output normalized values to a store element 413. The store element 413 is coupled to output to the input selection logic 402, the incrementing structure 417 and the rounding logic 415. The incrementing structure 417 is coupled to outputs to the multiplexer 419, which is also coupled to receive a control input from the rounding logic 415. The multiplexer 421 outputs to the formatting structure 421. The formatting structures is coupled to output to the store element 423.

In the first stage, the store elements 401 and 403 receive selected inputs from the input selection logic 402. The value in the store element 401 flows as input into the Booth encoding structures 407. The value in the store element 403 flows as input into the Booth selection values computation structures 405. The value input from the store element 403, the input from the rounding logic 415, and an early bypass route mask, as described in FIGS. 3A and 3B are received as input and determine the select values that will be generated by the Booth selection values computation structures 405. The value from the store element 403 may flow into one or more formatting structures prior to being input into the Booth select value computation structures 405. The select values computed will control the Booth encoding performed by the Booth encoding structures 407. The rounding logic 415 indicates whether the early bypass value should be rounded. The early bypass route mask indicates whether the early bypass value occurs once, twice or not at all in the current arithmetic operation. The combination of these three input values determine the adjustments to be made to the early bypass multiplier to account for bypassed rounding. The adjusted early bypass multiplier then controls the multiplexers of the Booth encoding structures 407.

Compensation for rounding in the Booth encoding structures take into consideration no rounding, a rounded early bypass value for one operand, and a rounded early bypass value for two operands. The following case descriptions provide an example for adjusting the Booth encoding selection values to compensate for rounding (i.e., compensate for the bypassed rounding). The first set of cases illustrate compensation for an early bypass value with its least significant bit position in an even bit position, which might be the case, for example, for single precision operands. The second set of cases illustrates rounding compensation for an early bypass value with its least significant bit in an odd bit position, which might be the case, for example, for double precision operands. Each of the case sets covers the scenarios of whether there is no rounding, the early bypass value is rounded and occurs once within the dependent arithmetic operation, or the early bypass value is rounded and occurs twice within the dependent arithmetic operation. Assuming the early bypass value is S, and the rounding was performed to generate a value C, then C=S+1. If the multiplier bypass value is rounded and occurs once within a current multiplication operation, then compensating for the rounding involves adding an additional multiplicand (i.e., C*D=D*C=(S+1)*D=D*S+D). If the multiplier bypass value is rounded and occurs twice within a current multiplication operation, then the compensating for the rounding involves adding two of the multiplicand and a one (i.e., C*C=(S+1)*(S+1)=S*S+2*S+1). Various techniques can be utilized to add the one. For example, an extra bit can be inserted into a carry save adder in the appropriate column. To add the multiplicands, whether once, twice, etc., the following sets of cases are illustrative. For all cases illustrated in the first set of cases, the position of the LSB is bit position 4 and bit ordering is Big-Endian. In the following scenarios, the values A, B, C, and D can be any value.

| Case 1: early bypass value = . . . Z Y X W 0 0 0 0 0 0 | |
|---|---|
| bit positions | Booth Selection Values ...9 8 7 6 5 4 3 2 1 0 |
| To add 0 | ZYX XW0 000 000 000 |
| To add 1 multiplicand | ZYX XW0 010 000 000 |
| To add 2 multiplicands | ZYX XW0 011 000 000 |

| Case 2: early bypass value = . . . Z Y X W 0 1 0 0 0 0 | |
|---|---|
| bit positions | Booth Selection Values ...9 8 7 6 5 4 3 2 1 0 |
| To add 0 | ZYX XW0 010 000 000 |
| To add 1 multiplicand | ZYX XW0 011 000 000 |
| To add 2 multiplicands | ZYX XW1 110 000 000 |

| Case 3: early bypass value = . . . Z Y X W 1 0 0 0 0 0 | |
|---|---|
| bit positions | Booth Selection Values ...9 8 7 6 5 4 3 2 1 0 |
| To add 0 | ZYX XW1 100 000 000 |
| To add 1 multiplicand | ZYX XW1 110 000 000 |
| To add 2 multiplicands | ZYX XW1 111 000 000 |

| Case 4: early bypass value = . . . Z Y X W 1 1 0 0 0 0 | |
|---|---|
| bit positions | Booth Selection Values ...9 8 7 6 5 4 3 2 1 0 |
| To add 0 | ZYX XW1 110 000 000 |
| To add 1 multiplicand | ZYX XW1 111 000 000 |
| To add 2 multiplicands | ZYX XW1 010 000 000 |

These are the values that would be sent to Booth encoding structures. Certain of the bit positions affect multiple Booth selection values. Bit positions 7, 5, and 3 affect two Booth selection values, as illustrated by the bit positions being offset with respect to the value they contribute to the Booth selection value. As shown below, many of these Booth Selection Values are not unique.

The adjustment to the early bypass value accounts for bypassed compensation and performs selections in the Booth encoding structures accordingly. The following case set illustrates exemplary cases of adjustments to an early bypass value for Booth encoding if the early bypass value is rounded and has a least significant bit in an odd bit position.

| Case 1: early bypass value = . . . Z Y X W 0 0 0 0 0 0 | |
|---|---|
| bit positions | Booth Selection Values ...9 8 7 6 5 4 3 2 1 0 |
| To add 0 | ZYX XW0 000 000 000 |
| To add 1 multiplicand | ZYX XW0 011 000 000 |
| To add 2 multiplicands | ZYX XW1 000 000 000 |

| Case 2: early bypass value = . . . Z Y X W 1 0 0 0 0 0 | |
|---|---|
| bit positions | Booth Selection Values ...9 8 7 6 5 4 3 2 1 0 |
| To add 0 | ZYX XW1 100 000 000 |
| To add 1 multiplicand | ZYX XW1 000 000 000 |
| To add 2 multiplicands | ZYX XW1 011 000 000 |

Fewer cases need be considered for the scenario of the LSB residing in an odd bit position, because there is more flexibility. There is more flexibility for an LSB in an odd bit position because the next bit position (bit position 6 for our example) is not considered, in contrast to the LSB in an even bit position.

An example early bypass value is not limited to the above exemplary selection values. The following table illustrates Booth selection values from a different perspective. The following table 2 includes all the possible bit combinations for an early bypass value with an LSB at either bit position 4 or position 5. The table also provides the value at position 4 for each bit combination, and the value at position 5.

TABLE 2

Bit combinations and corresponding values

| Bit positions | 5 4 3 | Value at position 4 | Value at position 5 |
|---|---|---|---|
| Combo 1 | 0 000 | 0 | 0 |
| Combo 2 | 0 001 | 1 | 0.5 |
| Combo 3 | 0 010 | 1 | 0.5 |
| Combo 4 | 0 011 | 2 | 1 |
| Combo 5 | 0 100 | −2 | −1 |
| Combo 6 | 0 101 | −1 | −0.5 |
| Combo 7 | 0 110 | −1 | −0.5 |
| Combo 8 | 0 111 | 0 | 0 |
| Combo 9 | 1 000 | 4 | 2 |
| Combo 10 | 1 001 | 5 | 2.5 |
| Combo 11 | 1 010 | 5 | 2.5 |
| Combo 12 | 1 011 | 6 | 3 |
| Combo 13 | 1 100 | 2 | 1 |
| Combo 14 | 1 101 | 3 | 1.5 |
| Combo 15 | 1 110 | 3 | 1.5 |
| Combo 16 | 1 111 | 4 | 2 |

If the LSB is bit position 4, then for each bit combination you can find the value at bit position 4 of the early bypass value, and then locate the rounded value at bit position 4. For example, if the early bypass value is represented by bit combination 13, and compensating for bypassed rounding required addition of two multiplicands (e.g., the early bypass value occurs twice within the dependent multiplication operation), then the desired value at bit position 4 will be its current value of 2 plus two more). Hence, the selection value can either be bit combination 9 or bit combination 16, because both have a value of 4 at bit position 4. If the LSB is bit position 5, then the same exercise can be conducted for bit position 5. If the current value at bit position 5 is 1, and compensating for bypass calls for an addition of two multiplicands, then the appropriate Booth line selection value will have a value of 3 at bit position 5. Only one of the bit combinations has a value of 3 at bit position 5, which is bit combination 12.

The Booth selection values computation structures 405 determine the appropriate selection values dependent, at least in part, on the early bypass value, input from the rounding logic 415, and the early bypass route mask. The input from the rounding logic 415 indicates whether the early bypass value requires rounding. The information utilized from the early bypass route mask indicates the number of occurrences of the early bypass value in current dependent multiplication operation. As the data from the store element 401 flows through the multiplexers of the Booth encoding structures 407, the computed Booth selection values from the Booth selection values computation structures 405 control output of the Booth encoding structures 407. Output from the Booth encoding structures 407 is stored in the store element 409.

The data in the store element 409 flows into the adding and normalizing structures 411. The adding and normalizing structures 411 perform normalizing computations on the data from the store element 409, and output from the normalizing structures flows into the store element 413. The value from the store element 413 flows back up to the input selection logic 402, and into the structures of the rounding stage. In addition to the early bypass value being supplied earlier, the early bypass value may also travel a shorter distance (i.e., a channel from output of the normalization structures to the input selection logic is shorter than a channel from output of the rounding structures to the input selection logic). The value from the store element 413 flows into the incrementing structure 417, a multiplexer 419, and the rounding logic 415. As the value from the store element 413 travels back to the input selection logic 402, the rounding computations are performed. Concurrently performing the rounding computations and supplying the unrounded value to the input stage of the arithmetic path, facilitates availability of the unrounded value for one or more dependent arithmetic operations as well as an indication of whether the unrounded value should be rounded. A dependent arithmetic operation can commence execution with the supplied early bypass value and indication of whether the early bypass value is affected by bypassed computations will be available to be taken into consideration when the early bypass value reaches the arithmetic computations. The availability of the bypass affect indication allows the arithmetic computations to account for any affects from bypassed computations.

The incrementing structure 417 increments the value from the store element 413. The rounding logic determines whether the value from the store element 413 should be rounded. Output from the rounding logic 415 controls output of the multiplexer 419. Dependent on the control output from the rounding logic 415, the multiplexer 419 selects either the rounded value from the incrementing structure 417 or the unrounded value from the store element 413. The organization and structures involved in performing rounding computations may vary across different realizations of the invention (e.g., the value from the store element 413 may not flow directly into the multiplexer 419), and the incrementing structure 417 outputs both the rounded and unrounded values to the multiplexer 419. The selected output from the multiplexer 419 flows into the formatting structure 421. Output from the formatting structure 421 flows into the store element 423.

Addition

Particular techniques to compensate for bypassed computations may vary across realizations of the described invention and across types of arithmetic operations. The exemplary technique illustrated above compensated for the bypassed computations in computing the Booth selection values for multiplication. Compensating for bypassed computations, particularly bypassed rounding computations, affect shift amounts in the following exemplary illustration for addition.

Figure 5:
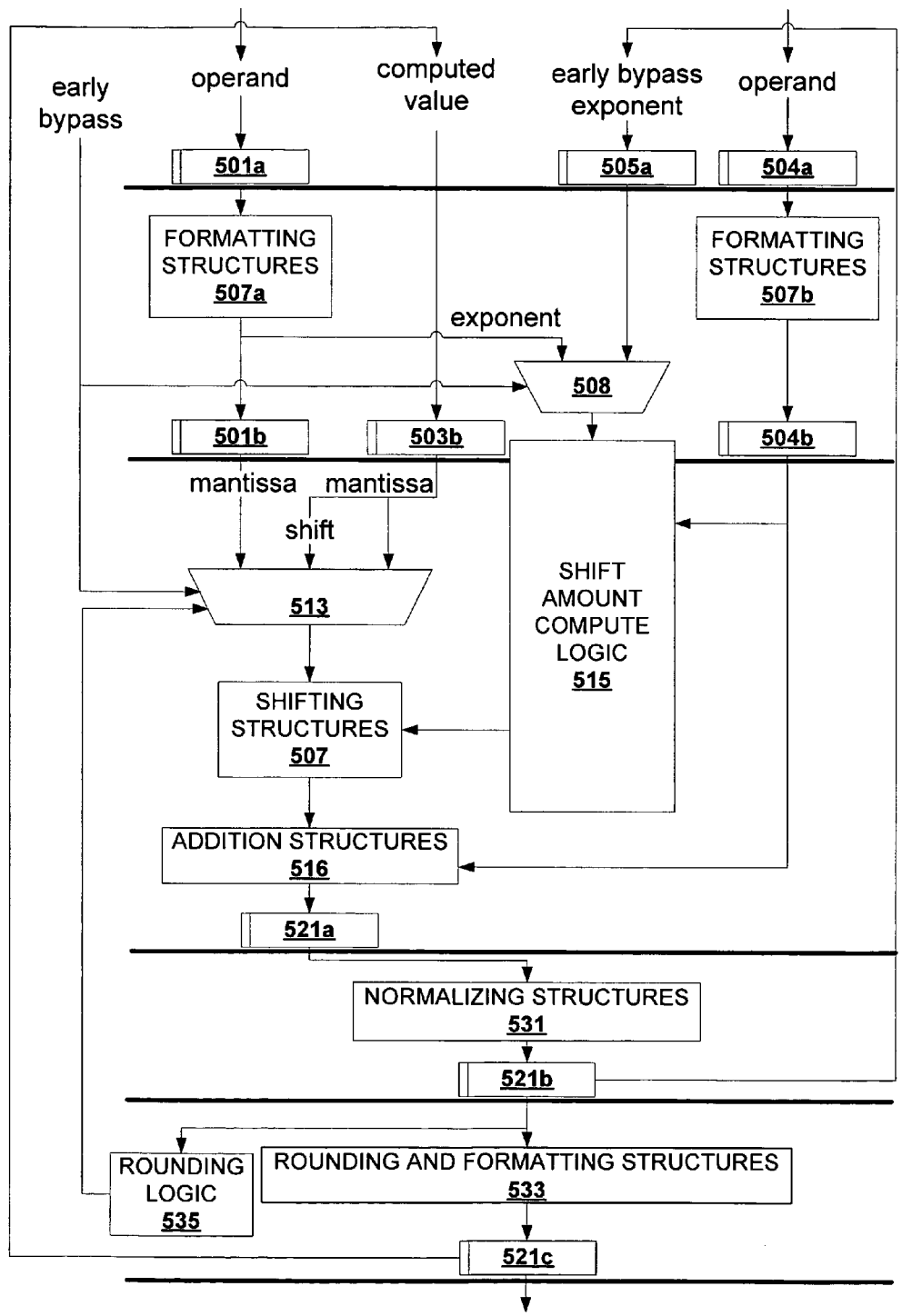
FIG. 5 depicts exemplary arithmetic structures that compensates for bypassed rounding computations in executing a dependent addition operation.

FIG. 5 depicts exemplary arithmetic structures that compensates for bypassed rounding computations in executing a dependent addition operation. A first stage of the illustrated addition path includes store elements 501a, 505a, and 504a, each of which receive input. A second stage includes formatting structures 507a and 507b, a multiplexer 508, and store elements 501b, 503b, and 504b. A third stage includes a multiplexer 513, aligning structures 507, a store element 521a, addition structures 516, and a shift amount compute logic 515. The shift amount compute logic 515 overlaps the second and the third stage. A fourth stage includes normalizing structures 531 and a store element 521b. A fifth stage includes rounding and formatting structures 533, rounding logic 535, and a store element 521c.

The store element 501a is coupled with the formatting structures 507a. The formatting structures 507a are coupled with the multiplexer 508 and the store element 501b. The store element 505a is coupled with the multiplexer 508. The store element 504a is coupled with the formatting structures 507b. The formatting structures 507b are coupled with the store element 504b. The multiplexer 508 is coupled with the shift amount compute logic 515 in the second stage. The store elements 501b and 503b are coupled with the multiplexer 513. The store element 504b is coupled with the shift amount compute logic 515 in the third stage. The multiplexer 513 and the shift amount compute logic 515 are coupled with the shifting structures 507. The shifting structures 507 and the store element 504b are coupled with the addition structures 516. The addition structures 516 are coupled with the store element 521a. The store element 521a is coupled with the normalizing structures 531. The normalizing structures are coupled with the store element 521b. The store element 521b is coupled with the store element 505a, the rounding and formatting structures 533, and the rounding logic 535. The rounding logic 535 is coupled with the multiplexer 513. The rounding and formatting structures are coupled with the store element 521c. The store element 521c is coupled with the store element 503b.

In the first and second stage, the appropriate inputs are selected. In the first stage, the store elements 501a and 504a receive operands for an addition operation, assuming no early bypass. The store element 505a receives an exponent portion of an early bypass value. The values in the store elements 501a and 504a respectively flow into the formatting structures 507a and 507b. The output of the formatting structures 507a and 507b respectively flow into the store elements 501b and 504b. The exponent portion of the output of the formatting structures 507a flows into the multiplexer 508. If the current addition operation is a dependent operation, then the computed value from a source arithmetic operation is received by store element 503b. Note that no formatting is needed since the early bypass is already in the internal format. Also, the early bypass exponent flows from the store element 505a into the multiplexer 508. An early bypass indicator (e.g., early bypass route mask, early bypass true or false indicator, etc.) is provided as control for the multiplexer 508. The multiplexer 508 selects the exponent output from the formatting structures 507a if there is no early bypass, and the early bypass exponent if there is early bypass.

The mantissa of the value from the store element 501b, and the mantissa from the store element 503b flow into the multiplexer 513. The mantissa from the store element 503b flows into the multiplexer 513 as two inputs. A first of the two inputs is shifted by one, while the second of the two inputs is not adjusted. The shifting of the mantissa reflects the possibility that the exponent should have been incremented (e.g., rounding of the mantissa causes a change in the position of the most significant bit). This compensates for an unincremented exponent that should have been incremented (e.g., the mantissa was all 1's and was rounded). The unincremented exponent will affect the shift amount computed by the shift amount compute logic 515. The shift amount computed with the unincremented exponent will be compensated by shifting the mantissa. If the rounding logic indicates that the early bypass exponent should have been incremented and the early bypass mask indicates that a condition exists for early bypass, then the multiplexer 513 selects the shifted mantissa, which is a one bit followed by all zeros essentially reducing the shifting to moving the unique one bit by one position, from store element 503b as output, which is input into the shifting structures 507. If there is no early bypass condition, then the multiplexer 513 selects the mantissa input from the store element 501b. If there is an early bypass condition, but the early bypass exponent is not to be incremented, then the multiplexer 513 selects the unshifted input mantissa from the store element 503b. The shift amount compute logic 515 computes the amount of shifting necessary to align the values for adding. The computed shift amount(s) flow into the shifting structures 507, which align the mantissa from the multiplexer 513. The output from the shifting structures 507 flow into addition structures 516. The value from the store element 504b also flows into the addition structures 516. The output from the addition structures 516 flows into the store element 521a. The sum from the store element 521a flows into the normalizing structures 531. Output from the normalizing structures flow into the store element 521b. The value in the store element 521b flows into the rounding and formatting structures 535 and the rounding logic 415. The rounding and formatting structures perform rounding and formatting, and store the result in the store element 521c.

In the above example, only one operand bypass was provided for in order to simplify the presentation of the concepts involved. In practice, one would want to provide for the bypass of either or both operands, using the technique described above on both operands.

Multiply-Add

A multiply-operation can be implemented with structures similar to those described in FIGS. 4 and 5. The multiplication computations would compensate for bypassed rounding that affects the product and aligning computations would compensate for bypassed rounding that affects the sum. A multiply-add path may organize the structures that perform aligning computations (e.g., computing shift amounts and shifting) in parallel with structures that perform multiplication computations (e.g., computing Booth selection values and Booth encoding). The sum of the exponents of the multiplicand and multiplier would be supplied to the structures that compute the shift amount for the value to be added to the product being computed.

Figure 6:
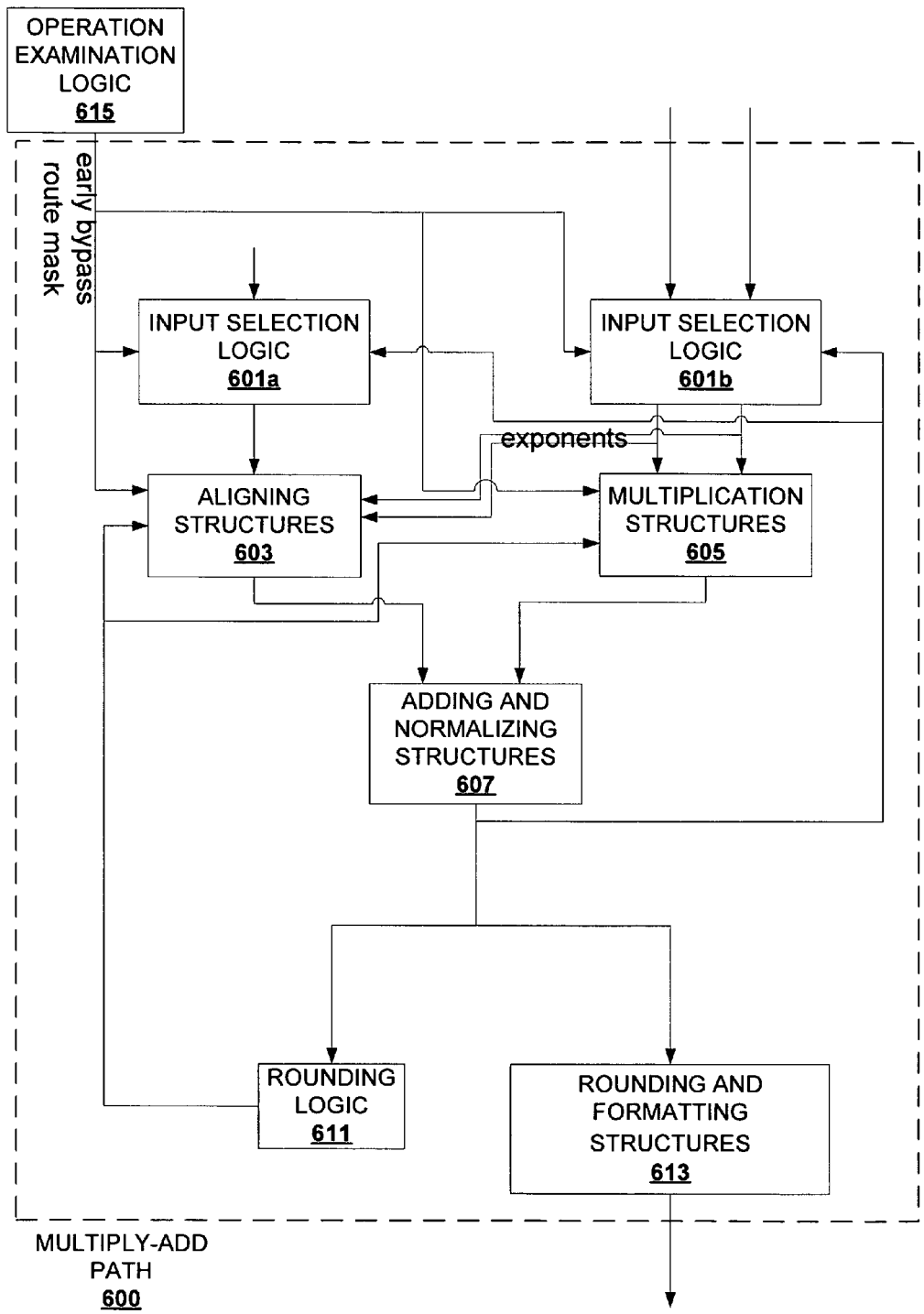
FIG. 6 depicts exemplary structures for a multiply-add path that compensates for bypassed rounding.

FIG. 6 depicts exemplary structures for a multiply-add path that compensates for bypassed rounding. A multiply-add path 600 is coupled to receive an early bypass route mask from an operation examination logic 615. The multiply-add path 600 includes input selection logic 601a and 601b, aligning structures 603, multiplication structures 605, adding and normalizing structures 607, rounding and formatting structures 613, and rounding logic 611. The early bypass route mask controls whether the input selection logic 601a selects an early bypass exponent value as input or a new operand. The early bypass route mask also controls whether input selection logic 601b selects an early bypass value and, if the early bypass value is selected, controls whether the early bypass value is routed as the multiplier or both the multiplier and the multiplicand. The input selected by the input selection logic 601a flows into aligning structures 603. The exponents or sum of the exponents of the values selected by the input selection logic 601b. The aligning structures 603 compute shift amounts and shift the selected input in accordance with the early bypass route mask (indicating whether there is any early bypass and how many occurrences) and an indication from the rounding logic 611 whether the early bypass exponent should have been rounded. The aligned value flows from the aligning structures 603 to the addition structures 607.

The multiplication structures 605 receive the selected input from the input selection logic 601b, as well as the early bypass route mask and an indication of whether rounding was bypassed from the rounding logic 611. The value generated by the multiplication structures 605 flows to the adding and normalizing structures 607. The output of the adding and normalizing structures 607. The normalized value from the adding and normalizing structures 607 flows into the rounding and formatting structures 613 and the rounding logic 611. A result value is generated by the rounding and formatting structures 613.

The above example realizations supply an early bypass value back to the same arithmetic path. However, it should be appreciated that an early bypass value and indication of whether the early bypass value should have been rounded may be supplied to a different arithmetic path. For example, a subtraction operation may be dependent on the results of a multiply operation. In such case, an early bypass value is supplied from the implementing multiplication path to the implementing subtraction path. In addition, realizations may include operation examination logic and/or input selection logic coupled with multiple arithmetic paths of same or different types that route early bypass values between the multiple arithmetic paths.

The described invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other types of medium suitable for storing electronic instructions.

Figure 7:
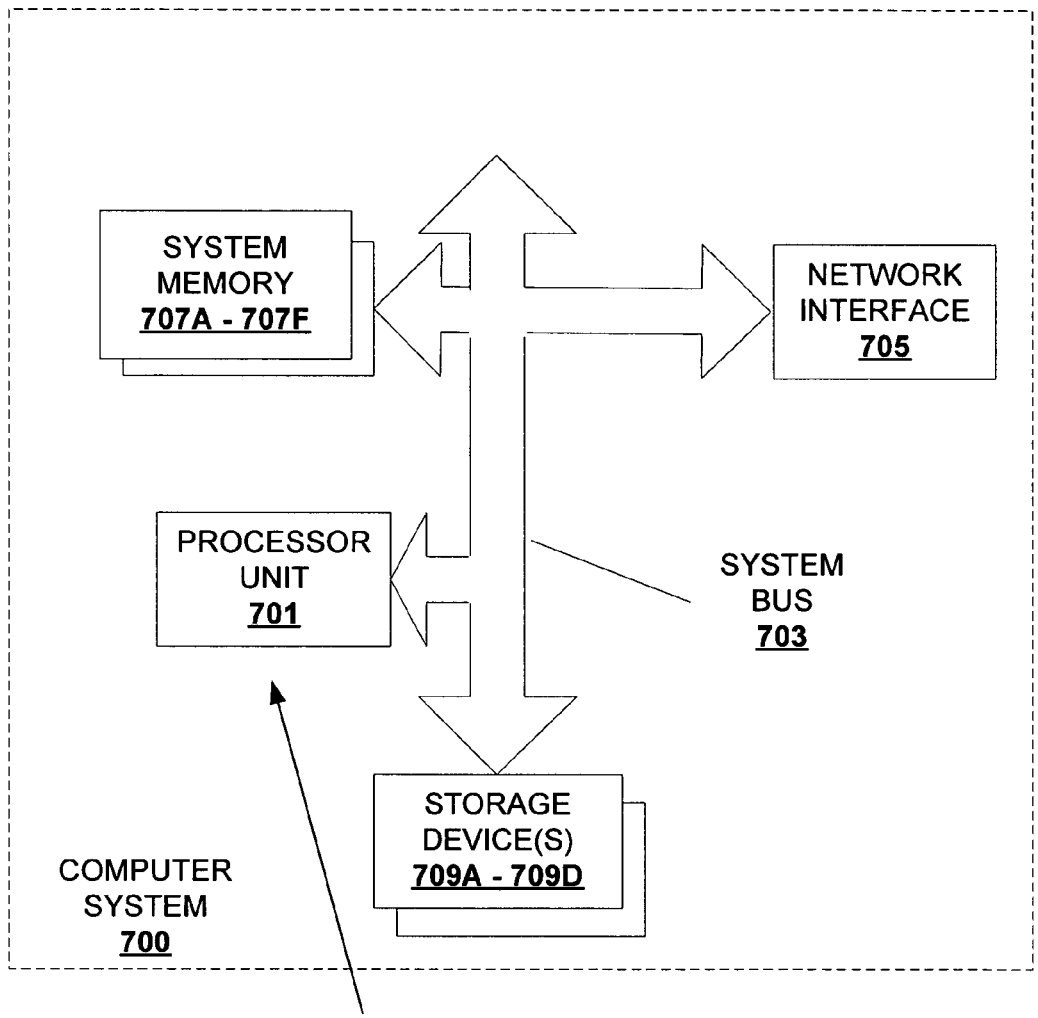
FIG. 7 depicts an exemplary computer system according to realizations of the invention.

FIG. 7 depicts an exemplary computer system according to realizations of the invention. A computer system 700 includes a processor unit 701 (possibly including multiple processors, a single threaded processor, a multi-threaded processor, a multi-core processor, etc.). The computer system 700 also includes a system memory 707A-707F (e.g., one or more of cache, SRAM DRAM, RDRAM, EDO RAM, DDR RAM, EEPROM, etc.), a system bus 703 (e.g., LDT, PCI, ISA, etc.), a network interface 405 (e.g., an ATM interface, an Ethernet interface, a Frame Relay interface, etc.), and a storage device(s) 709A-709D (e.g., optical storage, magnetic storage, etc.). Realizations of the invention may include fewer or additional components not illustrated in FIG. 7 (e.g., video cards, audio cards, additional network interfaces, peripheral devices, etc.). The processor unit 701, the storage device(s) 709A-709D, the network interface 705, and the system memory 707A-707F are coupled to the system bus 703. The processor unit 701 includes arithmetic path(s) with early bypass lines and structures that compensate for bypassed computations. Some or all of the functionality that compensates for bypassed computations may be embodied as logic in the processor unit 701, a co-processor unit not illustrated, in a sequence of instructions encoded in the processor unit 701, a sequence of instructions encoded in the system memory 707A-707F, etc. In addition, the processor unit 701 includes structures to select inputs to the arithmetic path(s). For example, the processor unit 701 may include input selection logic as described in FIGS. 4, 5, and 6. The functionality of routing and/or selecting inputs may partially or wholly be embodied as a sequence of instructions instead or in addition to structures to perform such functionality. The sequence of instructions embodying input selection/routing functionality may be embodied in the processor unit 701, one or more of the system memory 707A-707F, both the processor unit 701 and the system memory 707A-707F, etc.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. For example, the blocks and logic units identified in the description are for understanding the described invention and not meant to limit the described invention. Functionality may be separated or combined in blocks differently in various realizations of the invention or described with different terminology.

These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A processing unit comprising:
    an arithmetic path including an input stage, at least one arithmetic stage, a normalize stage, and a round stage, wherein at least said at least one arithmetic stage performs arithmetic computations for a first arithmetic operation; and
    an early bypass value line coupled to said arithmetic path following at least said at least one arithmetic stage so that said early value line supplies a value generated from the arithmetic computations to a second arithmetic operation as at least one operand,
        wherein the supplied value bypassing computations performed in the arithmetic path subsequent to the arithmetic computations of the first arithmetic operation performed by said at least one arithmetic stage, and said arithmetic path compensates for at least some of the bypassed computations in arithmetic computations performed for the second arithmetic operation.

2. The processing unit of claim 1, wherein the subsequent computations include at least one of rounding in said rounding stage, normalizing in said normalizing stage, and formatting in said rounding stage.

3. The processing unit of claim 2, wherein the bypassed computations at least include the rounding.

4. The processing unit of claim 3, wherein the arithmetic computations performed for the second arithmetic operation compensate for the bypassing of the rounding.

5. The processing unit of claim 4,
    wherein the arithmetic stage includes Booth encoding structures to perform multiplication and the input stage includes at least one structure to determine one or more selection values as input into the Booth encoding structures; and
    wherein the selection values are determined dependent, at least in part, on the bypassed computations.

6. The processing unit of claim 5, wherein the selection values are determined dependent, at least in part, on whether the supplied value should have been rounded, and a number of occurrences of the supplied value in the second arithmetic operation.

7. The processing unit of claim 1 further comprising:
    a rounding logic operable to determine whether the supplied value is to be rounded; and
    an operation examination logic operable to examine arithmetic operations to determine dependencies and generate a mask that indicates the determined dependencies.

8. The processing unit of claim 7, wherein the supplied value is routed in accordance with the mask.

9. The processing unit of claim 1, wherein the arithmetic computations include at least one of addition, multiplication, subtraction, and multiplication-addition.

10. A computer-processor based method comprising:
performing arithmetic computations for a first arithmetic operation to generate a value wherein said first arithmetic operation includes subsequent computations and at least some of said subsequent computations modify said value; and
supplying a said value for said subsequent computations for the first arithmetic operation;
supplying the value as at least one operand for performance of a dependent second arithmetic operation; and
accounting for said at least some of said subsequent computations in the performance of the dependent second arithmetic operation.

11. The method of claim 10, wherein said at least some of the subsequent computations accounted for in performance of the dependent second arithmetic operation are computations affecting the output of the dependent second arithmetic operation.

12. The method of claim 10, wherein the supplying the value for the subsequent computations for the first arithmetic operation and the supplying the value as at least one operand for performance of the dependent second arithmetic operation are concurrent.

13. The method of claim 10, wherein the supplying of the value as at least one operand for performance of the dependent second arithmetic operation precedes completion of the subsequent computations.

14. The method of claim 13 further comprising determining how the at least some of the subsequent computations modify the value and the accounting for said at least some of the subsequent computations dependent, at least in part, on such determination.

15. The method of claim 10 further comprising determining one or more dependencies between the first arithmetic operation and the dependent second arithmetic operation.

16. The method of claim 15, wherein the accounting is dependent, at least in part, on the determined dependencies.

17. The method of claim 10, wherein the first arithmetic operation and the dependent second arithmetic operation include one or more of addition, multiplication, and subtraction.

18. The method of claim 10, wherein the accounting for the at least some of said subsequent computations comprises computing Booth selection values for Booth encoding to account for rounding of the supplied value.

19. The method of claim 10, wherein the accounting for the at least some of said subsequent computations comprises shifting a mantissa generated from the subsequent computations to account for incrementing of an exponent that corresponds to the mantissa.

20. A computer-processor based method comprising:
bypassing a first set of arithmetic path structures using a channel, wherein said channel carries a first instance of a value generated by a structure preceding said first set of arithmetic path structures, wherein said first instance of said value is input to said first set of arithmetic path structures;
inputting said value carried by said channel to a second set of arithmetic structures; and
implementing in at least one structure in the second set of arithmetic path structures one or more computations to compensate for computations of the first set of arithmetic path structures that introduce differences between the first instance of the value and an output value from the first set of arithmetic path structures.

21. The method of claim 20, wherein the arithmetic path structures include at least one of a Wallace tree, Booth encoding structures, a carry save adder, a carry lookahead adder, and a shifter.

22. The method of claim 20 further comprising instrumenting timing of supplying of the first instance of the value to the second set of arithmetic path structures to allow commencement of computations implemented by the second set of arithmetic structures prior to completion of computations implemented by the first set of arithmetic path structures and indication of the differences introduced by the first set of arithmetic path structures during performance of the computations implemented by the second set of arithmetic structures.

23. A computer-processor based method comprising:
concurrently supplying a first instance of a first value for performance of a first set of computations for a first arithmetic operation and a second instance of the first value for performance of a second set of computations for a second arithmetic operation, wherein the first set of computations generate a second value from the first instance of the first value; and
for the second arithmetic operation, compensating for at least some of those of the first set of computations that modify the first instance of the first value to generate the second value;
wherein the second arithmetic operation is dependent on the first arithmetic operation; and
wherein the first value is generated from performance of a third set of computations for the first arithmetic operation.

24. The method of claim 23, wherein the first set of computations include at least one of rounding, normalizing, and formatting.

25. The method of claim 23, wherein the first and third sets of computations include at least one of addition computations, subtraction computations, and multiplication computations.

26. The method of claim 23, wherein the compensating comprises computing Booth selection values for Booth encoding based, at least in part, on the dependencies between the first and second arithmetic operations and the modifications to the second instance of the first value.

27. The method of claim 23, wherein the compensating comprises shifting a mantissa of the second value to compensate for the exponent of the first instance of the first value.

28. The method of claim 27, wherein the exponent is supplied for the second set of computations prior to supplying of the mantissa for the second set of computations.

29. The method of claim 28, wherein the first set of computations round the first instance of the first value to generate the second value, aligning computations of the second set of computations utilize the exponent of the second instance of the first value, and the mantissa is shifted to account for the unincremented exponent utilized in the aligning computations.

30. A computer-processor based method comprising:
generating a value during performance of a first arithmetic operation, the value viable for use in performing a second arithmetic operation;
utilizing the value to continue performance of the first arithmetic operation and commence performance of the second arithmetic operation, wherein the continued performance of the first arithmetic operation includes determining whether to modify the value for the first arithmetic operation; and compensating for modifications to the value for performance of the second arithmetic operation.

31. The method of claim 30, wherein the compensating is done in performance of the second arithmetic operation, during performance of the second arithmetic operation, or during continued performance of the first arithmetic operation.

32. The method of claim 30, wherein the modifications to the value include rounding.

33. The method of claim 30, wherein the continued performance of the first arithmetic operation includes at least one of normalizing, rounding, and formatting.

34. The method of claim 30 further comprising determining whether the second arithmetic operation is dependent upon the first arithmetic operation.

35. An apparatus comprising:
a first set of arithmetic structures configured to perform a first set of computations for an arithmetic operation;
a second set of arithmetic structures coupled to receive output from the first set of arithmetic structures, the second set of arithmetic structures configured to perform a second set of computations for the arithmetic operation; and
a channel coupled to supply a value output from the first set of arithmetic structures as input to the first set of arithmetic structures for a subsequent operation;
wherein the first set of computations compensate for at least one of the second set of computations bypassed by a value supplied over the channel.

36. The apparatus of claim 35, wherein the second set of computations include at least one of normalization, rounding, and formatting.

37. The apparatus of claim 35, wherein the first set of computations include at least one of addition, multiplication, and subtraction.

38. The apparatus of claim 37, wherein the first set of structures include one or more of Booth encoding structures, a Wallace tree, a carry save adder, a carry lookahead adder, and shifters.

39. The apparatus of claim 38, wherein the first set of computation compensate for bypassed rounding in computing Booth selection values.

40. The apparatus of claim 38, wherein the first set of computations compensate for bypassed rounding in shifting a mantissa to compensate for an exponent that bypassed rounding.

41. The apparatus of claim 35 further comprising input selection logic coupled to receive input from the channel and to output to the first set of arithmetic structures.

42. The apparatus of claim 41, wherein the input selection logic routes input from the channel to appropriate ones of the first set of structures.

43. The apparatus of claim 35, wherein the second set of structures include logic to determine whether rounding is performed.

44. The apparatus of claim 35 further comprising an operation examination logic to examine arithmetic operations for dependencies and indicate such dependencies to at least one of the first set of structures.

45. An apparatus comprising:
means for supplying a value generated from a first set of structures of a first arithmetic path to a first set of structures of a second arithmetic path, wherein the supplying means bypass a second set of structures of the first arithmetic path; and
means for compensating, in the first set of structures of the second arithmetic path, for those of the bypassed second set of structures that alter the value supplied from the first set of structures of the first arithmetic path.

46. The apparatus of claim 45 further comprising means for determining dependencies between arithmetic operations, and for indicating such dependencies.

47. The apparatus of claim 45 further comprising means for selecting input for the first and second arithmetic path from input operands and bypass values.

48. The apparatus of claim 45, wherein the first and second arithmetic paths are the same path.

49. The apparatus of claim 45, wherein the first and second arithmetic paths implement at least one of multiplication, addition, and subtraction.

50. The apparatus of claim 45, wherein the means for compensating compensates for those alterations in the supplied value that affect output of the second set of structures.

\* \* \* \* \*

UNITED STATES PATENT AND TRADEMARK OFFICE
CERTIFICATE OF CORRECTION

| | |
|---|---|
| PATENT NO. | : 7,421,465 B1 |
| APPLICATION NO. | : 10/932522 |
| DATED | : September 2, 2008 |
| INVENTOR(S) | : Leonard Dennis Rarick et al. |

Page 1 of 1

It is certified that error appears in the above-identified patent and that said Letters Patent is hereby corrected as shown below:

In Column 17, Line 12, Claim 10, between "supplying" and "said value", delete "a";
In Column 19, Line 43, Claim 39, replace "computation" with --computations--.

Signed and Sealed this

Third Day of March, 2009

JOHN DOLL
*Acting Director of the United States Patent and Trademark Office*